Patented June 6, 1944

2,350,792

UNITED STATES PATENT OFFICE 2,350,792

PROCESS FOR THE MANUFACTURE OF DERIVATIVES OF THE SATURATED AND UNSATURATED CYCLOPENTANOPOLYHYDROPHENANTHRENE SERIES

Karl Miescher, Riehen, and Albert Wettstein, Basel, Switzerland, assignors, by mesne assignments, to Ciba Pharmaceutical Products, Incorporated, Summit, N. J., a corporation of New Jersey No Drawing. Application July 16, 1938, Serial No. 219,656. In Switzerland July 19, 1937

13 Claims. (Cl. 260—397.3)

By this invention derivatives of the saturated and unsaturated cyclopentanopolyhydrophenanthrene series are obtained by converting an aldehyde or a carboxylic acid or carboxylic acid derivative of the said series into a secondary alcohol by reaction with an organic metal compound.

As parent materials for the invention there may be used quite generally saturated or mono- or poly-unsaturated compounds of the cyclopentanopolyhydrophenanthrene series containing in a side chain an aldehyde group or a carboxyl group or substituted carboxyl group such as a carboxylic acid halide, anhydride, ester or salt group; that is to say, for example, compounds of this kind derived from bodies of the type of etio-cholane, pregnane, estrone, hydroestrone and their stereoisomers. Moreover the aldehyde or carboxylic acid residue may be connected directly with the cyclic nucleus, for example in position 17 or 3, or it may be separated from the nucleus for example by one or more carbon atoms. Such aldehydes are obtainable, for example, by elimination of water from glycols or glycol ethers, by re-arrangement from halogenhydrins or ethylene oxide compounds and according to known methods from the corresponding carboxylic acids which themselves can be obtained, for example, by progressive or radical degradation from sterols, bile acids or genins from cardiac glucosides or by complete or partial synthesis, the latter starting, for example, from cyclic ketones. Besides the aldehyde or carboxyl group the parent materials may naturally contian further substituents, for example substituted or unsubstituted hydroxyl, carbinol, amino or hydrocarbon groups, also halogen atoms, cyclic keto-groups and in particular enol derivatives thereof such as enol esters or enol ethers. In the latter case the enol groups may be reconverted into keto-groups after the reaction. As parent materials there may be particularly named, for example, saturated and unsaturated halides, anhydrides, esters and salts of etio-cholanic acids such as 3-hydroxy-, 3-keto- and/or -17-hydroxy-etiocholanic acids, 3:11-diketo- or 3-keto-11-hydroxy- and/or -17-hydroxy-etio-cholanic acids, also the corresponding aldehydes. There may also be used analogous compounds, especially the aldehydes of the bisnorcholanic acid, etiocholane-17-acetic acid, nor-cholanic acid, cholanic acid, 3-carboxy-etiocholane or 3-carboxy-etio-cholanic acid series, as well as analogous carboxylic acids of the estrane or hydro-estrane series. Derivatives of any of these compounds may be used, for example, esters, ethers, enol esters or enol ethers, as well as stereoisomers of these compounds, especially compounds which differ in the configuration at carbon atoms 3, 5, 9, 11, 12, 17 and/or 20.

By organic metal compounds are understood saturated and unsaturated compounds of metals such as alkali metals, magnesium, calcium, zinc, cadmium, mercury, copper, aluminium or tin, with substituted or unsubstituted alkyl, aralkyl or aryl residues, for example metal hydrocarbon compounds such as lithium-methyl, sodium benzyl, phenyl-potassium, triphenylmethyl-sodium, acetylene-potassium, phenylacetylene-sodium, or dialkyls of zinc, magnesium, or mercury, aluminium-trialkyls, tin-di- and -tetra-alkyls; also organic metal halides, for example of calcium, mercury, tin or lead but especially those of magnesium and zinc, such as methyl-, ethyl-, propyl-, allyl-, vinyl-, acetylene-, methylether-, cyclohexyl-, phenyl- or benzyl-magnesium or -zinc-halides, or their components.

Since the reactivity of the different organic metal compounds and also that of the aldehydes, carboxylic acids or acid derivatives thereof varies considerably it is necessary that suitable pairs of reactants must be selected and suitable reaction conditions observed in order that secondary alcohols may be obtained; this is already known per se (see, for example Houben-Weyl, Methoden der organischen Chemie, 3rd edition, volume 3, pages 77 et seq., 93 and 97 et seq.). Thus for example in general secondary alcohols are obtained without difficulty by reaction of aldehydes with Grignard compounds. This is also the case in the reaction with zinc alkyls of low molecular weight. Even in the case of the dipropyl-zinc compounds, however, a simple reduction of the aldehyde group to a primary alcohol group becomes perceptible. If on the other hand the process starts with a carboxylic acid derivative such as a carboxylic acid halide or from a carboxylic acid anhydride or ester ketones are obtained preferentially by the action of one molecular proportion of a zinc dialkyl of low molecular weight; tertiary alcohols are also obtained by the prolonged action of several molecular proportions. If now there is used for example an organic metal compound, particularly of zinc and magnesium, which contains radicals of higher molecular weight, for example substituted or unsubstituted hydrocarbon radicals having 3 or more carbon atoms, the desired secondary alcohol is obtained. Instead of using an already prepared organic metal compound it is frequently to be recommended to cause the individual components of the compound to act on the aldehyde or the carboxylic acid or acid derivative; this is particularly the case when the organic metal compound is difficultly accessible or is indeed not known as such, for example in the case of the reaction of chloromethyl ether or vinyl bromide with magnesium. Also if it is desired to use an alkyl- or aryl-alkali metal compound the desired reaction may often be brought about more simply by using a hydrocarbon halide or a hydrocarbon mercury compound together with sodium.

The reaction mixture may be worked up according to known methods. Thus, for example, when a magnesium or zinc compound is used the addition compound containing metal which is generally formed as the primary product may be decomposed with a dilute acid. If there has been used for the reaction a compound containing a tertiary hydroxyl, acyloxy- or alkoxy-group in α-position to the aldehyde, carboxyl or substituted carboxyl group, for example a 17-hydroxy-, 17-acyloxy- or 17-alkoxy-compound, and containing also in 17-position, a formyl, carboxyl or substituted carboxyl group, water or acid or alcohol may be split off, either directly or after further reaction, for example after saponification, from the secondary-tertiary glycol or mono-substituted glycol formed. This splitting off may be brought about, for example by means of a mineral acid or an alkali, frequently in alcoholic solution, or by the action of phosphorus-hydroxychloride, a bisulfate, formic acid, oxalic acid, an acid anhydride, or by the action of heat, preferably under reduced pressure or in presence of an indifferent gas. In this manner ketones are obtained by way of re-arrangement and removal of the double linkage formed intermediately:

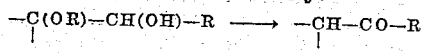

If there has been used as parent material a compound containing in α-position to the aldehyde, carboxyl or substituted carboxyl group neither a tertiary hydroxyl-, acyloxy- nor alkoxy group the resulting secondary alcohol may be treated in order to convert it into a ketone with an oxidizing agent or a dehydrogenating agent, for example with chromic acid in glacial acetic acid or with permanganate on the one hand, with a metal, a metal oxide, or with a metal alcoholate in the presence of carbonyl compounds (acetone, cyclohexanone and the like) on the other hand, whereby likewise ketones are obtained

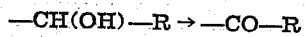

In carrying out this oxidation nuclear double linkages are advantageously temporarily protected unless such protection appears superfluous owing to the particular stability of the atomic grouping concerned, for example that of an α,β-unsaturated ketone. Generally this protection is secured by the addition of halogen or hydrogen halide and in order to restore the double linkage after oxidation the product is treated with an agent which causes elimination of halogen or halogen-hydride, for example zinc dust and acetic acid, zinc dust and an alcohol or an alkali-iodide and benzene on the one hand, or a tertiary base such as pyridine or dimethylaniline, an alkali or a salt of an organic acid on the other hand.

Naturally other substituents may enter into reaction with the organic metal compounds in addition to the aldehyde groups or the carboxylic acid groups or their derivatives. Thus Grignard compounds also react, for example, with hydroxyl, amino, acyloxy and keto groups and, less readily, also with halogen groups. In the former cases, however, the substituents are restored in unchanged or merely saponified form when the magnesium addition product is decomposed. Keto-groups present may be protected by intermediate conversion into enol derivatives, such as enol esters or enol ethers, if it is not desired that they shall react.

The secondary alcohols and the ketones of the cyclopentanopolyhydrophenanthrene series obtainable by the invention are compounds of therapeutic value or can be converted into such compounds. The stereoisomeric alcohols which may sometimes be produced owing to the appearance of a new centre of asymmetry, e. g. at carbon atom 20, may if desired be separated, for example by recrystallization. In most cases, however, this is unnecessary for the therapeutic application or further treatment of the products.

The following examples illustrate the invention, the parts being by weight:

*Example 1*

1 part of Δ⁵,⁶-3-hydroxy-17-formyl-etio-cholene (obtainable from Δ⁵,⁶-3-acetoxy-etio-cholenic acid by treating with thionyl chloride, then reducing the carboxylic acid chloride formed with hydrogen in presence of palladium-barium sulfate, and subsequent saponification) is dissolved in ether and the solution is added to an ethereal solution of methyl magnesium iodide. After the whole has been allowed to stand for a long time it is poured on to ice, dilute sulfuric acid is added until the reaction is acid and the ethereal layer is removed, washed with bicarbonate solution and with water, dried and evaporated. From the residue there is obtained by one recrystallization from dilute acetone a still crude Δ⁵,⁶-pregnene-diol-(3,20) of the formula

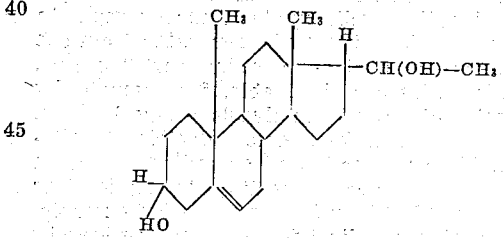

This product is dissolved in glacial acetic acid and there are then added first a solution of 1 mol of bromine in glacial acetic acid and following this a solution of 2 mols of chromium trioxide in acetic acid of 90 per cent strength and the whole is allowed to stand for 18 hours at room temperature. The product is then de-brominated by heating with zinc dust for 15 minutes at 80° C., the reaction mixture is filtered and the product is precipitated by addition of water to the filtrate and extracted with ether. From the residue from the washed and dried ethereal solution there is obtained by recrystallization from hexane, by way of the very sparingly soluble disemicarbazone and/or by sublimation at 115° C. under a pressure of 0.0005 millimetre, progesterone which crystallizes in dimorphous forms having respectively the melting points 120° C. and 129° C.

Instead of the 3-hydroxy-aldehyde there may be used as parent material, for example, the 3-enol-acetate of Δ⁴,⁵-3-keto-17-formyl-etio-cholene. The Δ⁴,⁵-pregnanol-(20)-one-(3) thereby obtained does not require intermediate bromination for the subsequent oxidation to pregnene-dione. Instead of oxidation a dehydrogenation process may be used, for example heating with copper powder under reduced pressure or with aluminium isopropylate or -isobutylate and acetone.

*Example 2*

1 part of the 3-enol-acetate of $\Delta^{4,5}$-17-acetoxy-17-formyl-etio-cholenone-(3) (obtainable from $\Delta^{5,6}$-3-oxy-etio-cholenic acid by oxidation to the corresponding 3-keto-compound, prolonged heating with acetic acid anhydride and then with glacial acetic acid, and, after treatment with thionyl chloride, by reducing the so formed carboxylic acid chloride with hydrogen in presence of palladium-barium-sulfate) is dissolved in ether and the solution is added in an atmosphere of nitrogen to an ethereal solution of zinc dimethyl. After several hours the reaction mixture is worked up as indicated in Example 1 and the crude product obtained is saponified with an alcoholic alkali solution of 3 per cent strength. There is thus obtained $\Delta^{4,5}$-pregnene-diol-(17,20)-one-(3) of the formula

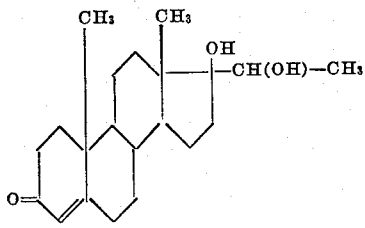

From this product water can be split off by heating for 2 hours with 60 parts of propyl alcohol or dioxane and 5 parts of hydrochloric acid or sulfuric acid. The product is sublimed in a high vacuum (0.0005 millimetre) at 115° C. or is purified by way of the very sparingly soluble disemicarbazone. By recrystallization from hexane there is obtained pure progesterone which crystallizes in dimorphous forms of melting points respectively 120° C. and 129° C.

Instead of the zinc methyl there may be used for the reaction, for example, methyl zinc iodide or even a higher alkyl magnesium halide such as ethyl magnesium bromide, butyl or amyl magnesium iodide and the like, whereby homologues of progesterone are obtained.

Instead of the 17-hydroxy-17-formyl compounds there may be used as parent material, for example, the corresponding 17-hydroxy-17-carboxy compounds or a derivative thereof, such as for example $\Delta^{5,6}$-3.17-diacyloxy-etio-cholenic acid halides. Compounds containing further hydroxy-groups or substituted hydroxy-groups, for example in 11- or 12-position, may also be used.

Saturated compounds, such as those of the 3-epi-hydroxy-allo-pregnane series can also be obtained in analogous manner.

The process for the preparation of the parent materials used in the present application, as exemplified for instance by the parenthetical inserts in Examples 1 and 2, per se constitutes no part of the present invention and no claim is here made to such process.

What we claim is:

1. A process for the manufacture of derivatives of the saturated and unsaturated cyclopentanopolyhydrophenanthrene series, comprising converting an aldehyde of this series into a secondary alcohol, by reaction with an organo metallic compound.

2. A process for the manufacture of derivatives of the saturated and unsaturated cyclopentanopolyhydrophenanthrene series, comprising converting into a secondary alcohol a compound of this series containing in 17-position an aldehyde group and a member of the group consisting of a free, an esterified and an etherified hydroxyl group, by reaction with an organo metallic compound.

3. A process for the manufacture of ketones of the saturated and unsaturated cyclopentanopolyhydrophenanthrene series, comprising converting into a secondary alcohol a compound of this series containing an aldehyde group and a group X which is in 17-position a member of the group consisting of a free, an esterified and an etherified hydroxyl group, by reaction with an organo metallic compound and treating the secondary-tertiary glycol thus obtained with an agent causing elimination of HX.

4. A process for the manufacture of ketones of the saturated and unsaturated cyclopentanopolyhydrophenanthrene series, comprising converting into a secondary alcohol a compound of this series containing in 17-position an aldehyde group and an esterified hydroxyl group by reaction with an organo metallic compound and treating the mono-substituted secondary-tertiary glycol thus obtained with a hydrolizing agent and an agent causing elimination of water.

5. A process for the manufacture of ketones of the saturated and unsaturated cyclopentanopolyhydrophenanthrene series, comprising converting an aldehyde of this series into a secondary alcohol, by reaction with an organo metallic compound and treating the secondary alcohol thus obtained with a member of the group consisting of an oxidizing and a dehydrogenating agent.

6. A process for the manufacture of ketones of the saturated and unsaturated cyclopentanopolyhydrophenanthrene series, comprising converting an aldehyde of this series into a secondary alcohol, by reaction with an organometallic compound and treating the secondary alcohol thus obtained with an oxidizing agent after intermediate protection of nuclear double linkages present.

7. A process for the manufacture of derivatives of the saturated and unsaturated cyclopentanopolyhydrophenanthrene series, comprising converting into a secondary alcohol an aldehyde of this series containing in at least one of the positions 3 and 11 of the cyclopentanopolyhydrophenanthrene nucleus a member of the group consisting of a keto-group and its enol derivatives, by reaction with an organo metallic compound.

8. A process for the manufacture of derivatives of the saturated and unsaturated cyclopentanopolyhydrophenanthrene series, comprising converting into a secondary alcohol an aldehyde of this series containing in at least one of the positions 3 and 11 of the cyclopentanopolyhydrophenanthrene nucleus a substituted enol group, by reaction with an organo metallic compound and treating with a hydrolyzing agent.

9. A process for the manufacture of ketones of the saturated and unsaturated cyclopentanopolyhydrophenanthrene series, comprising converting into a secondary alcohol a compound of this series containing in 17-position an aldehyde group and an etherified hydroxyl group, by reaction with an organo metallic compound and treating the monosubstituted secondary tertiary glycol which is obtained with a hydrolyzing agent and an agent causing elimination of water.

10. In a process for the manufacture of compounds suitable for the synthesis of the corpus luteum hormone, the step which comprises causing a cyclopentano-polyhydrophenanthrene compound containing on the carbon atom 17 together with a hydroxyl group an aldehyde group, to react with a methyl-metallo-compound of the Grignard type.

11. In a process for the manufacture of compounds suitable for the synthesis of the corpus luteum hormone, the step which comprises causing a 10,13-dimethyl cyclopentano-polyhydrophenanthrene compound containing on the carbon atom 17 together with a hydroxyl group an aldehyde group, to react with a methyl-metallo-compound of the Grignard type.

12. In a process for the manufacture of compounds suitable for the synthesis of the corpus luteum hormone, the step which comprises causing a 10,13-dimethyl cyclopentano-polyhydrophenanthrene compound containing on the carbon atom 17 together with a hydroxyl group an aldehyde group, to react with a methyl-metallo-compound of the Grignard type, and thereafter subjecting the secondary alcohol (20) having a hydroxyl group in 17-position to a water spliting off process.

13. Process for the manufacture of progesterone, comprising reacting a 10,13-dimethyl cyclopentano-polyhydrophenanthrene compound having a double bond between the carbon atom 5 and and an adjacent carbon atom, having in the 3-position a member of the group consisting of a keto group and groups convertible into a keto group with the aid of oxidation, and having at the 17-position a hydroxyl and an aldehyde group, with a methyl-metallo-compound of the Grignard type, to convert the aldehyde group into the group —CHOH.CH$_3$, splitting off water between the 17 and 20 hydroxyls, and replacing the substituent in the 3-position with a keto group, where the starting compound is not a 3-keto compound.

KARL MIESCHER.
ALBERT WETTSTEIN.